US006990063B1

(12) United States Patent
Lenoski et al.

(10) Patent No.: US 6,990,063 B1
(45) Date of Patent: Jan. 24, 2006

(54) DISTRIBUTING FAULT INDICATIONS AND MAINTAINING AND USING A DATA STRUCTURE INDICATING FAULTS TO ROUTE TRAFFIC IN A PACKET SWITCHING SYSTEM

(75) Inventors: Daniel E. Lenoski, San Jose, CA (US); William N. Eatherton, Sunnyvale, CA (US); John Andrew Fingerhut, San Mateo, CA (US); Jonathan S. Turner, St. Louis, MO (US)

(73) Assignees: Cisco Technology, Inc., San Jose, CA (US); Washington University, St. Louis, MO (US)

( * ) Notice: Subject to any disclaimer, the term of this patent is extended or adjusted under 35 U.S.C. 154(b) by 0 days.

(21) Appl. No.: 09/519,282

(22) Filed: Mar. 7, 2000

(51) Int. Cl.
  *G01R 31/08* (2006.01)
  *H04Q 11/00* (2006.01)
(52) U.S. Cl. .................... 370/218; 370/242; 370/388
(58) Field of Classification Search ........ 370/216–220, 370/241.1, 242, 244, 228, 225, 227, 366, 370/376, 386–389, 392, 221, 230, 231, 235; 714/799, 1–2, 25, 75
See application file for complete search history.

(56) References Cited

U.S. PATENT DOCUMENTS

| | | | |
|---|---|---|---|
| 4,491,945 A | | 1/1985 | Turner |
| 4,494,230 A | | 1/1985 | Turner |
| 4,630,259 A | * | 12/1986 | Larson et al. ............... 370/216 |
| 4,630,260 A | | 12/1986 | Toy et al. |
| 4,734,907 A | * | 3/1988 | Turner ........................ 370/390 |
| 4,745,593 A | * | 5/1988 | Stewart ...................... 370/244 |
| 4,829,227 A | | 5/1989 | Turner |
| 4,849,968 A | | 7/1989 | Turner |
| 4,893,304 A | | 1/1990 | Giacopelli et al. |
| 4,901,309 A | | 2/1990 | Turner |

(Continued)

OTHER PUBLICATIONS

Jonathan S. Turner, "An Optimal Nonblocking Multicast Virtual Circuit Switch," Jun. 1994, Proceedings of Infocom, 8 pages.

(Continued)

*Primary Examiner*—Chau Nguyen
*Assistant Examiner*—Ian N. Moore
(74) *Attorney, Agent, or Firm*—The Law Office of Kirk D. Williams

(57) ABSTRACT

Methods and apparatus are disclosed for distributing fault indications and maintaining and using a data structure indicating faults to route traffic in a packet switching system. In one embodiment, a packet switching system detects faults and propagates indications of these faults to the input interfaces of a packet switch, so the packet switch can adapt the selection of a route over which to send a particular packet. Faults are identified by various components of the packet switching system and relayed to one or more switching components to generate a broadcast packet destined for all input ports (i.e., to each I/O interface in a packet switch having folded input and output interfaces). Other embodiments, generate one or more multicast or unicast packets. The I/O interface maintains one or more data structures indicating the state of various portions of the packet switching system. In one embodiment, an output availability table is maintained indicating over which path a particular destination may be reached, as well as a link availability vector indicating which output likes of the input interface may be currently used. Using these as masks against possible routes in a fully functional system, the packet switching component (e.g., I/O interface) can identify which routes are currently available for reaching the destination of the received packet. These routes can then be selected between using one of numerous deterministic and non-deterministic methods.

10 Claims, 15 Drawing Sheets

U.S. PATENT DOCUMENTS

| | | | |
|---|---|---|---|
| 5,027,342 A * | 6/1991 | Boulton et al. | 370/225 |
| 5,127,000 A | 6/1992 | Henrion | |
| 5,161,156 A * | 11/1992 | Baum et al. | 714/4 |
| 5,173,897 A | 12/1992 | Schrodi et al. | |
| 5,179,551 A | 1/1993 | Turner | |
| 5,179,556 A | 1/1993 | Turner | |
| 5,229,990 A * | 7/1993 | Teraslinna | 370/218 |
| 5,229,991 A | 7/1993 | Turner | |
| 5,253,251 A | 10/1993 | Aramaki | |
| 5,260,935 A | 11/1993 | Turner | |
| 5,265,092 A * | 11/1993 | Soloway et al. | 370/238 |
| 5,339,311 A | 8/1994 | Turner | |
| 5,402,415 A | 3/1995 | Turner | |
| 5,471,460 A * | 11/1995 | Tanabe | 370/218 |
| 5,475,682 A | 12/1995 | Choudhury et al. | |
| 5,533,020 A | 7/1996 | Byrn et al. | |
| 5,689,500 A * | 11/1997 | Chiussi et al. | 370/235 |
| 5,768,572 A | 6/1998 | George et al. | |
| 5,842,040 A | 11/1998 | Hughes et al. | |
| 5,844,890 A | 12/1998 | Delp et al. | |
| 5,848,227 A * | 12/1998 | Sheu | 714/4 |
| 6,246,665 B1 * | 6/2001 | Watanabe et al. | 370/218 |
| 6,343,067 B1 * | 1/2002 | Drottar et al. | 370/231 |
| 6,366,557 B1 * | 4/2002 | Hunter | 370/217 |
| 6,411,599 B1 * | 6/2002 | Blanc et al. | 370/219 |
| 6,418,115 B1 * | 7/2002 | Iino et al. | 370/217 |
| 6,424,624 B1 * | 7/2002 | Galand et al. | 370/231 |
| 6,430,150 B1 * | 8/2002 | Azuma et al. | 370/218 |
| 6,654,342 B1 | 11/2003 | Dittia et al. | |
| 6,674,721 B1 | 1/2004 | Dittia et al. | |
| 6,728,211 B1 | 4/2004 | Peris et al. | |
| 6,735,173 B1 | 5/2004 | Lenoski et al. | |
| 6,747,972 B1 | 6/2004 | Lenoski et al. | |
| 6,788,689 B1 | 9/2004 | Turner et al. | |
| 6,816,492 B1 | 11/2004 | Turner et al. | |
| 6,826,186 B1 | 11/2004 | Dittia et al. | |

OTHER PUBLICATIONS

Chaney et al., "Designs of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

U.S. Appl. No. 09/705,450, filed Nov. 2, 2000, Turner et al.
U.S. Appl. No. 09/784,787, filed Feb. 15, 2001, Turner et al.
U.S. Appl. No. 09/705,395, filed Nov. 2, 2000, Turner et al.
U.S. Appl. No. 09/949,125, filed Sep. 7, 2001, Dejanovic et al.

* cited by examiner

DISTRIBUTING FAULT INDICATIONS AND MAINTAINING AND USING A DATA STRUCTURE INDICATING FAULTS TO ROUTE TRAFFIC IN A PACKET SWITCHING SYSTEM

FIELD OF THE INVENTION

This invention relates to maintaining, communicating, and reacting to faults in packet switching systems; and more particularly, the invention relates to distributing fault indications and maintaining and using a data structure indicating faults used to route traffic through a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

As used herein, the term "packet" refers to packets of all types, including, but not limited to, fixed length cells and variable length packets. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof.

Consumers and designers of these systems typically desire high reliability and increased performance at a reasonable price. A commonly used technique for helping to achieve this goal is for systems to provide multiple paths between a source and a destination. Packets of information are then dynamically routed and distributed among these multiple paths. It is typically more cost-effective to provide multiple slower rate links or switching paths, than to provide a single higher rate path. Such designs also achieve other desired performance characteristics.

It is important that packet switching systems are fault tolerant and appropriately detect and react to faults. Prior approaches to adapt to and overcome faults within a packet switch typically rely on full redundancy in order to enable fault-masking of failures. For example, such a system might include one or more extra interconnection networks that could become active and replace another interconnection network which has a detected failure. Such approaches are typically costly. Needed are new apparatus and methods for reacting to faults within a packet switching system.

SUMMARY OF THE INVENTION

Apparatus and methods are disclosed for propagating and reacting to detected faults in a packet switching system. In one embodiment, a packet switching system includes multiple input components of the packet switching system sending multiple packets to a multiple output components over multiple interconnection networks. After the packet switching system recognizes an error within the packet switching system, the packet switching system notifies the multiple input components of the error.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Methods and apparatus are disclosed for accumulating, distributing and reacting to detected faults and other error conditions in a packet switching system. Such methods and apparatus are not limited to a single packet switching environment. Rather, the architecture and functionality taught herein are extensible to an unlimited number of packet switching environments and embodiments in keeping with the scope and spirit of the invention. Embodiments described herein include various elements and limitations, with no one element or limitation contemplated as being a critical element or limitation. Each of the claims individually recite an aspect of the teachings disclosed herein in its entirety. Moreover, some embodiments described may include, inter alia, systems, integrated circuit chips, methods, and computer-readable medium containing instructions. The embodiments described hereinafter embody various aspects and configurations within the scope and spirit of the invention.

In one embodiment, a packet switching system detects faults and propagates indications of these faults to the input interfaces of a packet switch. The packet switch may select a route for a particular packet to avoid these faults. In this manner, packet loss may be decreased upon a failure condition, and with only a short interruption delay being limited by the time to detect a failure and to send updates to the input sources.

Faults are identified by various components of the packet switching system and relayed to one or more switching components to generate a broadcast packet destined for all input ports (e.g., to each I/O interface in a packet switch having folded input and output interfaces). Other embodiments generate one or more multicast or unicast packets. An I/O interface may be used to maintain one or more data structures indicating the state of various portions of the packet switching system. In one embodiment, an output availability table is maintained indicating a path over which a particular destination may be reached, as well as a link availability vector indicating which output links of the input interface may be currently used. Using these as masks against possible routes in a fully functional system, the packet switching component (e.g., I/O interface) can identify which routes are currently available for reaching the destination of the received packet. These routes can then be selected from among those using numerous deterministic and non-deterministic methods.

Figure 1A:
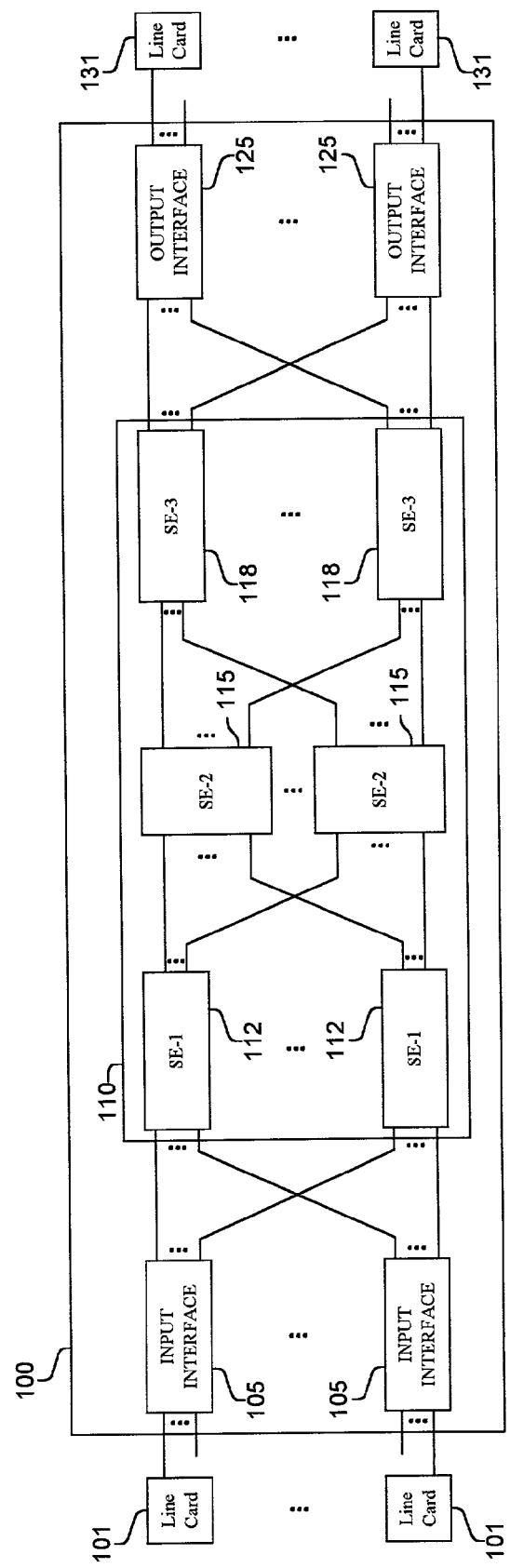
FIGS. 1A–C are block diagrams of a few of many possible embodiments of a switching system.

FIGS. 1A–3C and their discussion herein are intended to provide a description of various exemplary packet switching systems. FIGS. 1A–C illustrate the basic topology of different exemplary packet switching systems. FIG. 1A illustrates an exemplary packet switch 100 having multiple inputs and outputs and a single interconnection network 110. FIG. 1B illustrates an exemplary packet switch 140 having multiple interconnection networks 141 and folded input and output interfaces 149. FIG. 1C illustrates an exemplary folded packet switch 160 having multiple interconnection networks 161 and folded input and output interfaces 169. Embodiments of each of these packet switches 100, 140 and 160 receive, generate, accumulate, distribute, and react to detected faults in the manners disclosed herein. Of course, the invention is not limited to these illustrated operating environments and embodiments, and the packet switching systems may have more or less elements.

FIG. 1A illustrates an exemplary embodiment of a packet switch 100. Packet switch 100 comprises multiple input interfaces 105, interconnection network 110, and output interfaces 125. Input interfaces 105 and output interfaces 125 are both coupled over multiple links to interconnection network 110. Line cards 101 and 131 are coupled to input interfaces 105 and output interfaces 125. In certain embodiments including other packet switching topologies, line cards or their functionality may be included in the packet switch itself, or as part of the packet switching system.

In one embodiment, interconnection network 110 comprises multiple switch elements SE-1 112, SE-2 115, and SE-3 118 that are interconnected by multiple links. Line cards 101 and 131 may connect to other systems (not shown) to provide data items (e.g., packets) to be routed by packet switch 100. Fault indications may be generated, consumed, or processed at one or more of the line cards 101, 131, input interfaces 105, switch elements SE-1 112, SE-2 115, and SE-3 118, output interfaces 125, and/or other locations within packet switch 100 or the packet switching system.

Figure 1B:
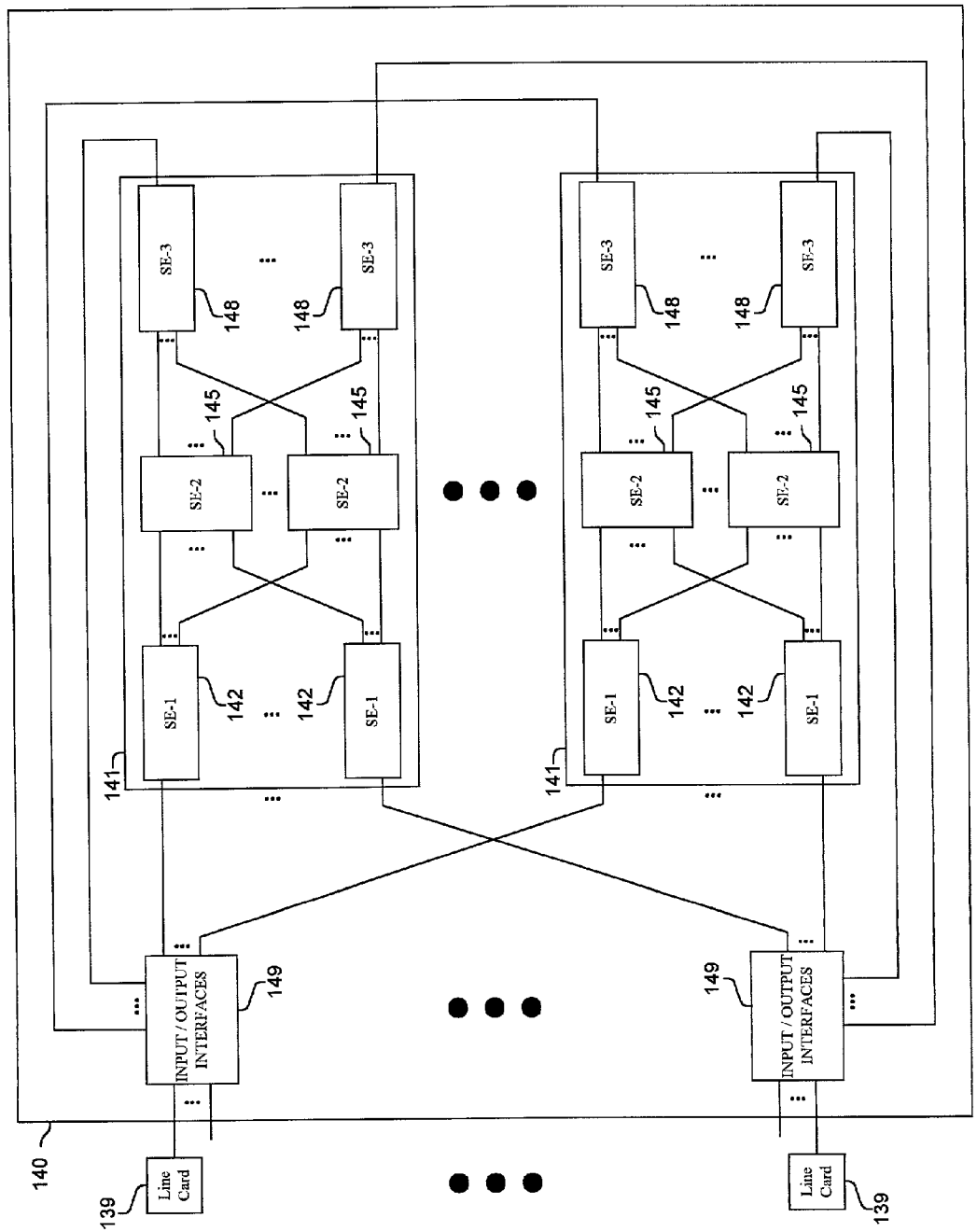

FIG. 1B illustrates another exemplary operating environment and embodiment of a packet switch 140. Packet switch 140 comprises multiple folded input and output interfaces 149 interconnected over multiple links to interconnection networks 141, which are interconnected over multiple links returning to input and output interfaces 149. In one embodiment, interconnection networks 141 comprise multiple switch elements SE-1 142, SE-2 145, and SE-3 148 also interconnected by multiple links. Interfaces 149 may connect via bi-directional links to line cards 139 that connect with other systems (not shown) to provide data items (e.g., packets) to be routed by packet switch 140. Fault indications may be generated, consumed, or processed at one or more of the line cards 139, input and output interfaces 149, switch elements SE-1 142, SE-2 145, and SE-3 148, and/or other locations within packet switch 140 or the packet switching system.

Figure 1C:
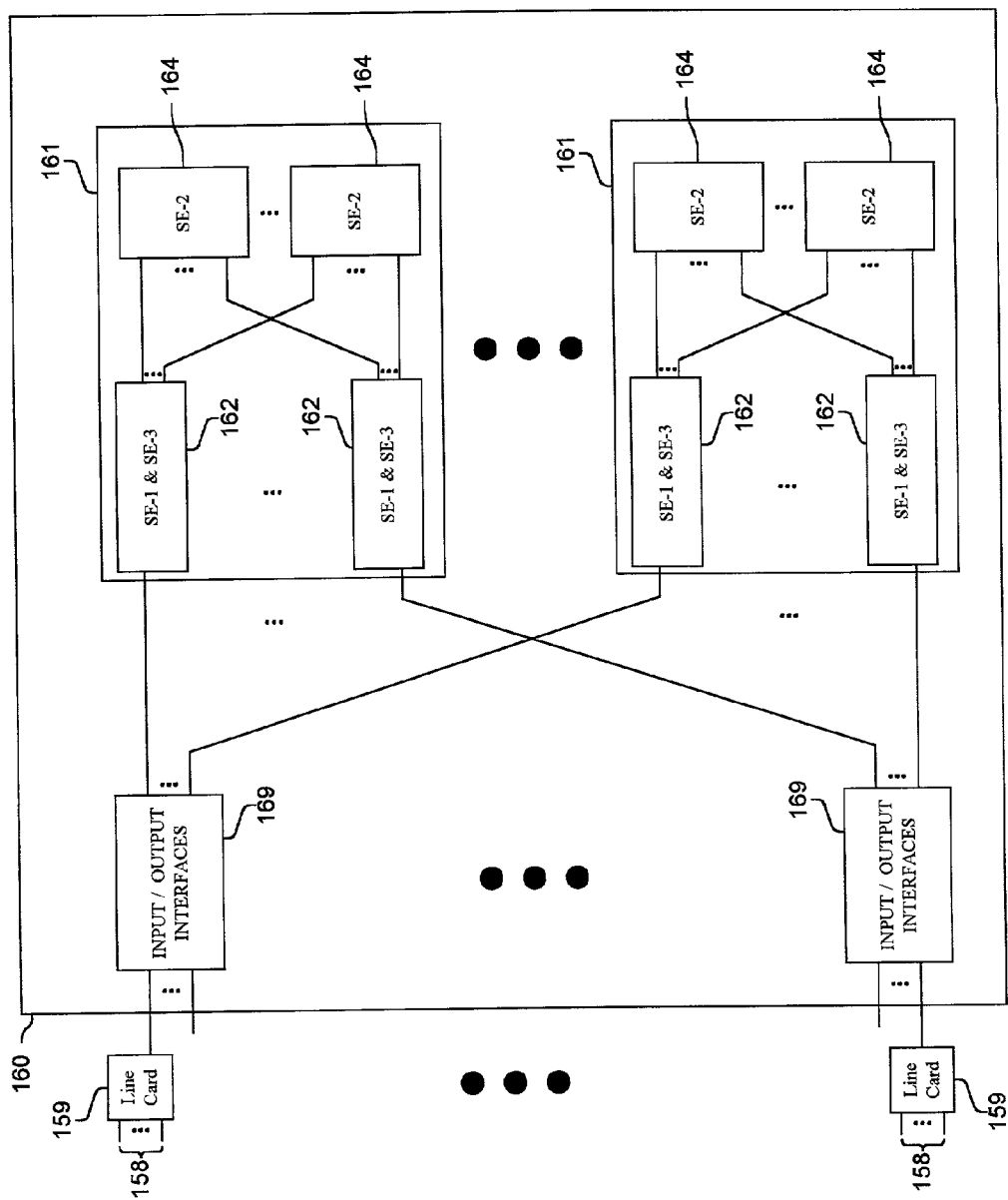

FIG. 1C illustrates another exemplary operating environment and embodiment of a packet switch 160. Packet switch 160 has a folded network topology. Packet switch 160 comprises multiple folded input and output interfaces 169 interconnected over multiple links to interconnection networks 161, which are interconnected over multiple links returning to interfaces 169. In one embodiment, interconnection networks 161 comprise multiple switch elements SE-1 & SE-3 162 and SE-2 164 also interconnected by multiple links. Interfaces 169 may connect via bi-directional links to line cards 159 which connect via ports 158 to other systems (not shown) to provide data items to be routed by packet switch 160. Fault indications may be generated, consumed, or processed at one or more of the line cards 159, input and output interfaces 169, switch elements SE-1 & SE-3 162 and SE-2 164, and/or other locations within packet switch 160 or the packet switching system.

Figure 2A:
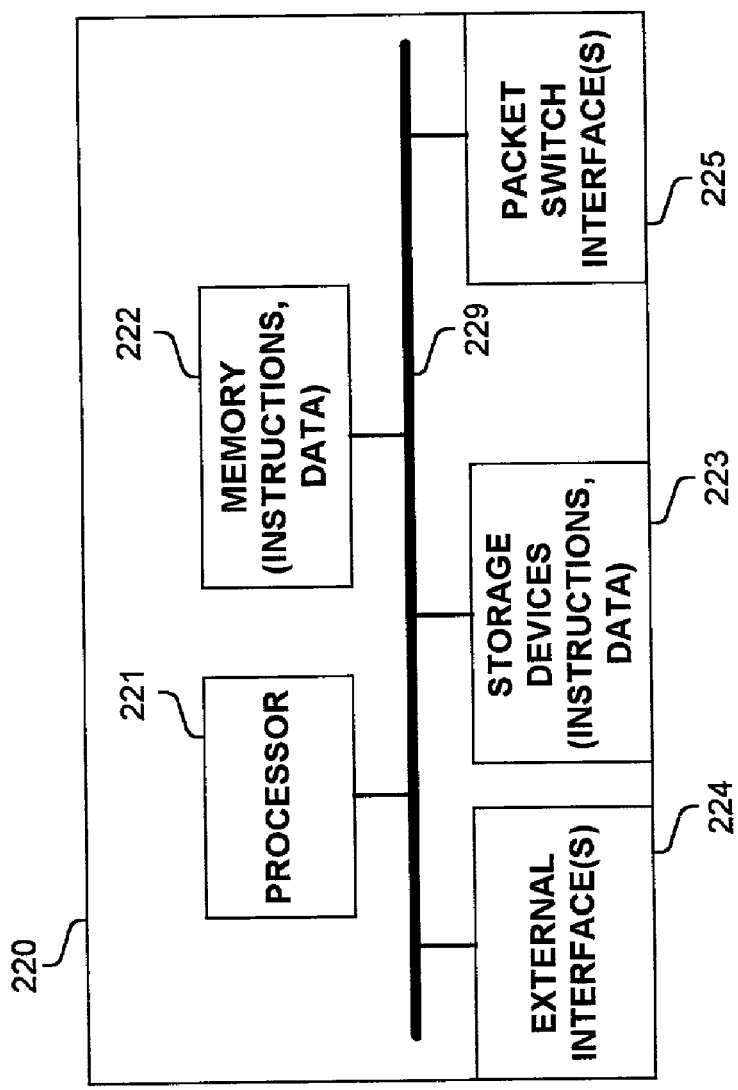
FIGS. 2A–C are block diagrams illustrating exemplary embodiments of a packet switching system component, such as, for example, a line card and/or input/output interface.
Figure 2B:
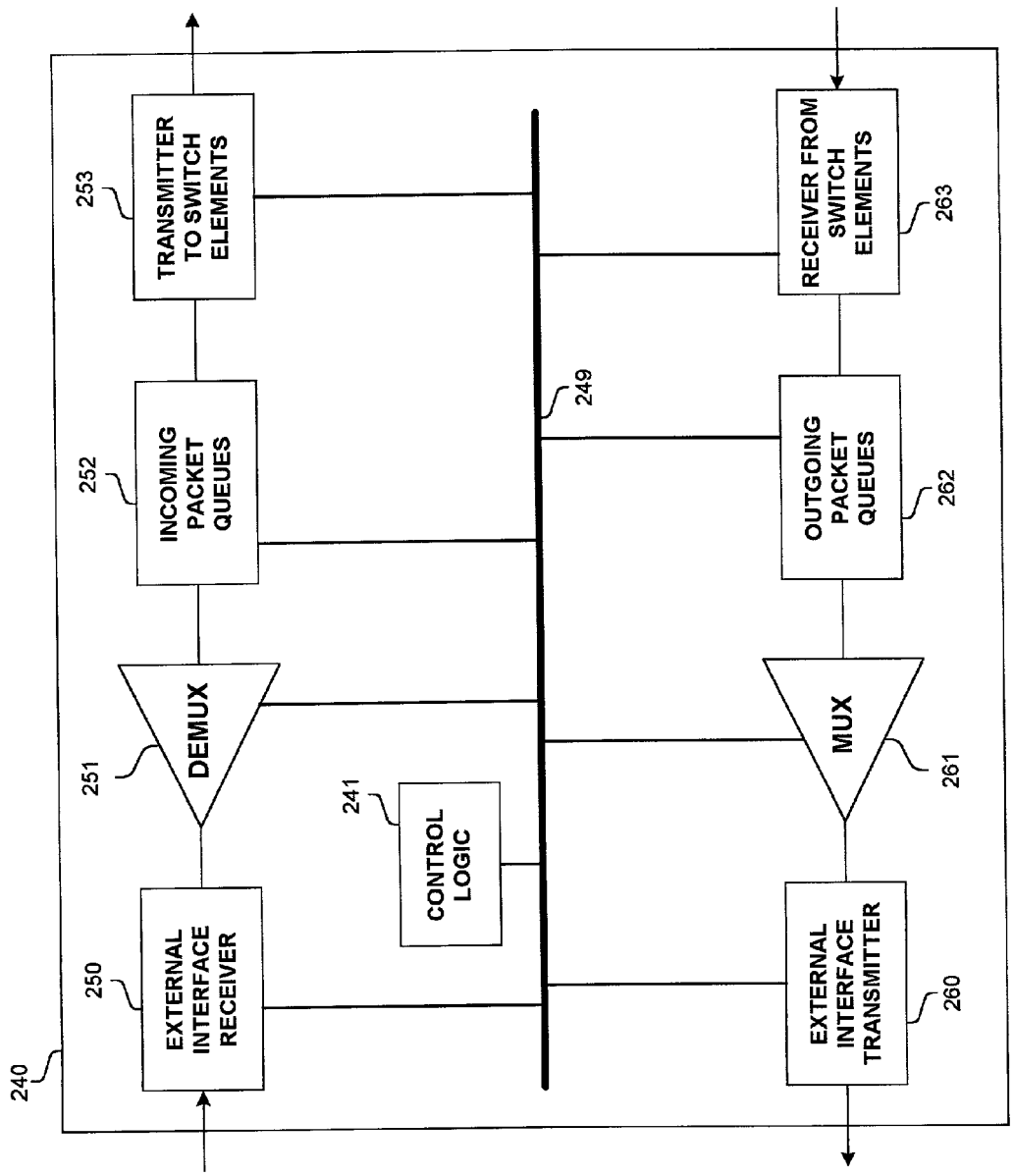
Figure 2C:
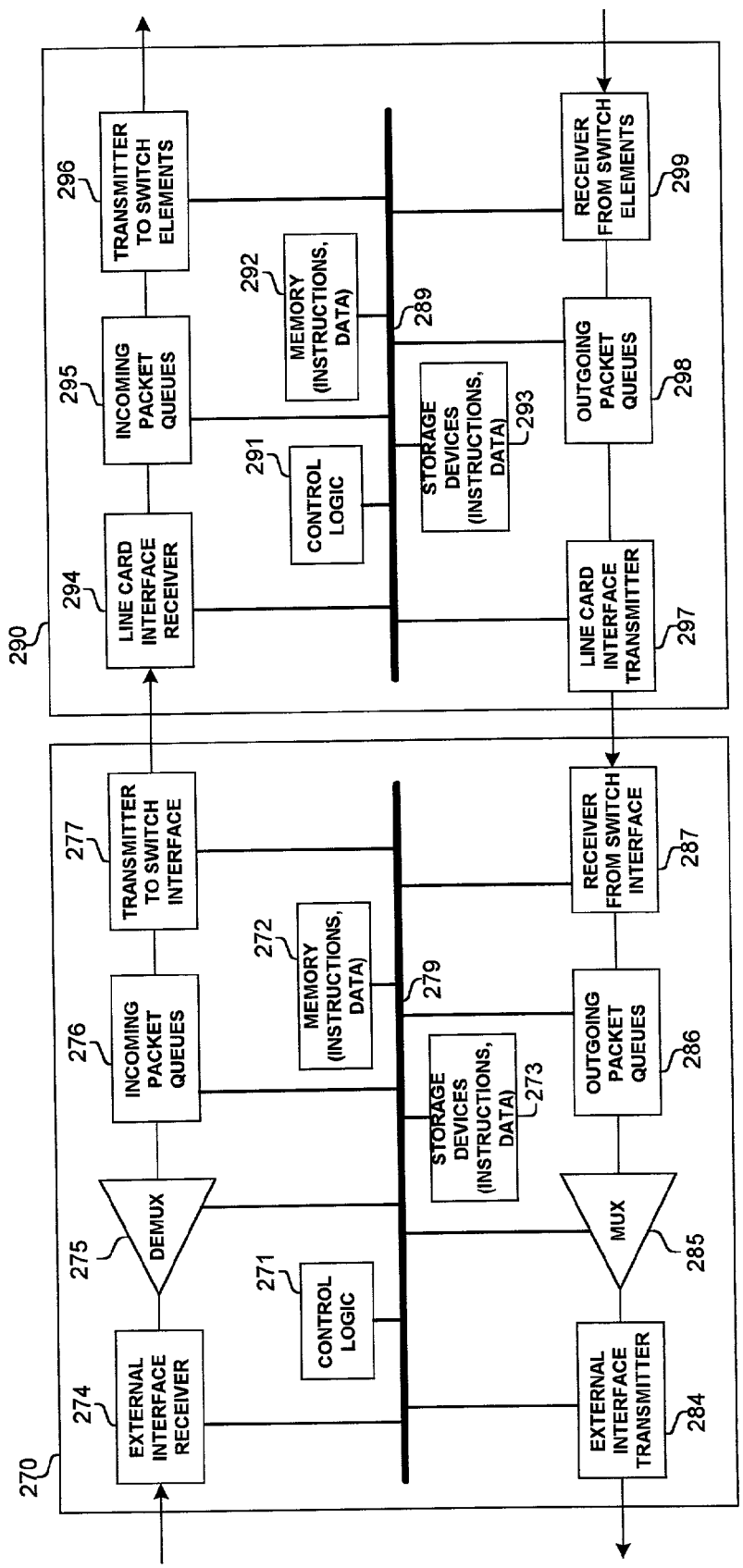

FIGS. 2A–C illustrate three of numerous possible embodiments of a line card, input interface, output interface, and/or input/output interface. For illustrative purposes, only single transmitters and receivers may be shown. It should be clear to one skilled in the art that multiple transmitters and receivers may be used to communicate with multiple sources and destinations (e.g., line cards, switch fabrics, etc.).

FIG. 2A illustrates one component 220 comprising a processor 221, memory 222, storage devices 223, and one or more external interface(s) 224, and one or more packet switch interface(s) 225, and one or more internal communications mechanisms 229 (shown as a bus for illustrative purposes). External interface(s) 224 transfer external signals with one or more communications devices or networks (e.g., one or more networks, including, but not limited to the Internet, intranets, private or public telephone, cellular, wireless, satellite, cable, local area, metropolitan area and/or wide area networks). Memory 222 is one type of computer-readable medium, and typically comprises random access memory (RAM), read only memory (ROM), integrated circuits, and/or other memory components. Memory 222 typically stores computer-executable instructions to be executed by processor 221 and/or data which is manipulated by processor 221 for implementing functionality in accordance with certain embodiments of the invention. Storage devices 223 are another type of computer-readable medium, and typically comprise disk drives, diskettes, networked services, tape drives, and other storage devices. Storage devices 223 typically store computer-executable instructions to be executed by processor 221 and/or data which is manipulated by processor 221 for implementing functionality an apparatus disclosed herein. Component 220 generates, consumes, processes and reacts to fault indications.

As used herein, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

FIG. 2B illustrates one component 240 having a single element providing the functionality of a line card and an input/output interface, for example that of line card 159 and input/output interface 169 (FIG. 1C). FIGS. 2B–C will be described in relation to FIG. 1C for illustrative purposes; however, these embodiments could be used with other packet switch topologies and other implementations and embodiments. Component 240 comprises control logic 241 implementing functionality disclosed herein. In one embodiment, control logic 241 includes memory for storage of data and instructions. Control logic 241 is connected to other elements of component 240 via one or more internal communications mechanisms 249 (shown as a bus for illustrative purposes). External interface receiver 250 receives external signals, converts these signals using demultiplexer 251 into multiple streams of packets which are temporarily stored in incoming packet buffer 252. At the appropriate time, a packet is sent to the appropriate switch element SE-1 & SE-3 162 via transmitter to switch elements 253. Packets are received from switch elements SE-1 & SE-3 162 at the receiver from switch elements 263 and placed in the outgoing packet buffer 262. Multiplexer 261 extracts the packets and creates a multiplexed signal that is transmitted via external interface transmitter 260. Additionally, control logic 241 receives, generates, processes and reacts to fault indications as described hereinafter.

FIG. 2C illustrates one embodiment of a line card 270 and a switch interface 290, which could correspond to line card 159 and input/output interfaces 169 illustrated in FIG. 2C.

Line card 270 illustrated in FIG. 2C includes control logic 271 to control operations of the line card 270. Control logic 271 is connected to other components of line card 270 via one or more internal communications mechanisms 279 (shown as a bus for illustrative purposes). In one embodiment, control logic 271 includes memory for storing instructions and data. Line card 270 also includes optional additional memory 272 and storage devices 273. External interface receiver 274 receives external signals. 201 (FIG. 2), separates the signals into channels using demultiplexer 275 into multiple streams of packets which are temporarily stored in incoming packet buffer 276. At the appropriate time, a packet is sent to switch interface 290 via transmitter to switch interface 277. Packets are received from switch interface 290 at the receiver from switch interface 287 and placed in the outgoing packet buffer 286. Multiplexer 285 extracts the packets and creates a multiplexed signal which is transmitted via external interface transmitter 284. In one embodiment, control logic 271, referencing a data structure within control logic 271 or memory 272, stores fault indications. Line card 270 may receive, generate, process and react to fault indications as described hereinafter. In certain embodiments, fault conditions may be hidden from a line card by other components which react to the fault indications.

The embodiment of input/output interface 290 illustrated in FIG. 2C includes control logic 291 implementing functionality in accordance with certain embodiments of the invention. Control logic 291 is connected to other components of switch interface 290 via one or more internal communications mechanisms 289 (shown as a bus for illustrative purposes). In one embodiment, control logic 291 includes memory for storing instructions and data. Switch interface 290 also includes optional additional memory 292 and storage devices 293. Line card receiver 294 receives packets from line card 270 temporarily stores the packets in incoming packet buffer 295. At the appropriate time, a packet is sent to an appropriate switch element SE-1 & SE-3 162 via transmitter to switch elements 296. Packets are received from switch elements SE-1 & SE-3 162 at the receiver from switch elements 299 and placed in the outgoing packet buffer 298. Line card interface transmitter 297 then forwards these packets to line card 270. In one embodiment, control logic 291, referencing a data structure within control logic 291 or memory 292, stores fault indications which could be received from a line card, packet switch, or internally generated. Input/output interface 290 receives, generates, processes and reacts to fault indications as described hereinafter.

Figure 3A:
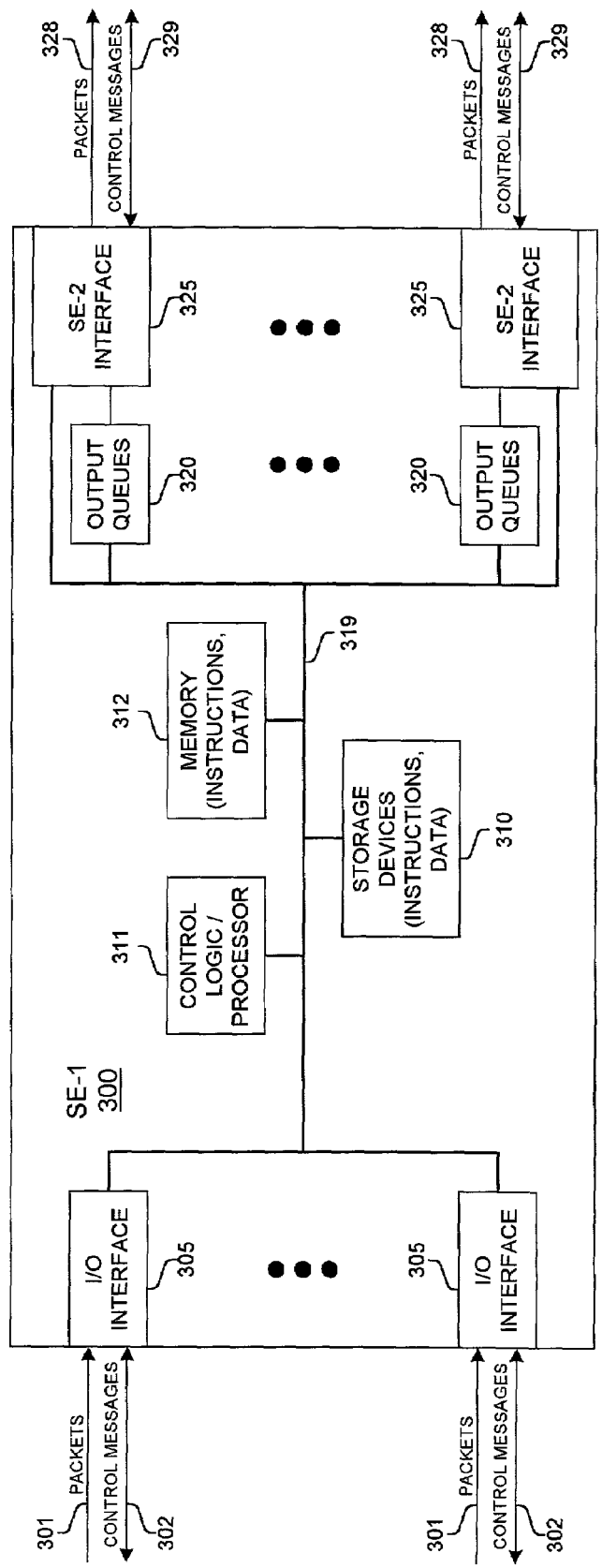
FIGS. 3A–C are block diagrams of exemplary switching fabric components.
Figure 3B:
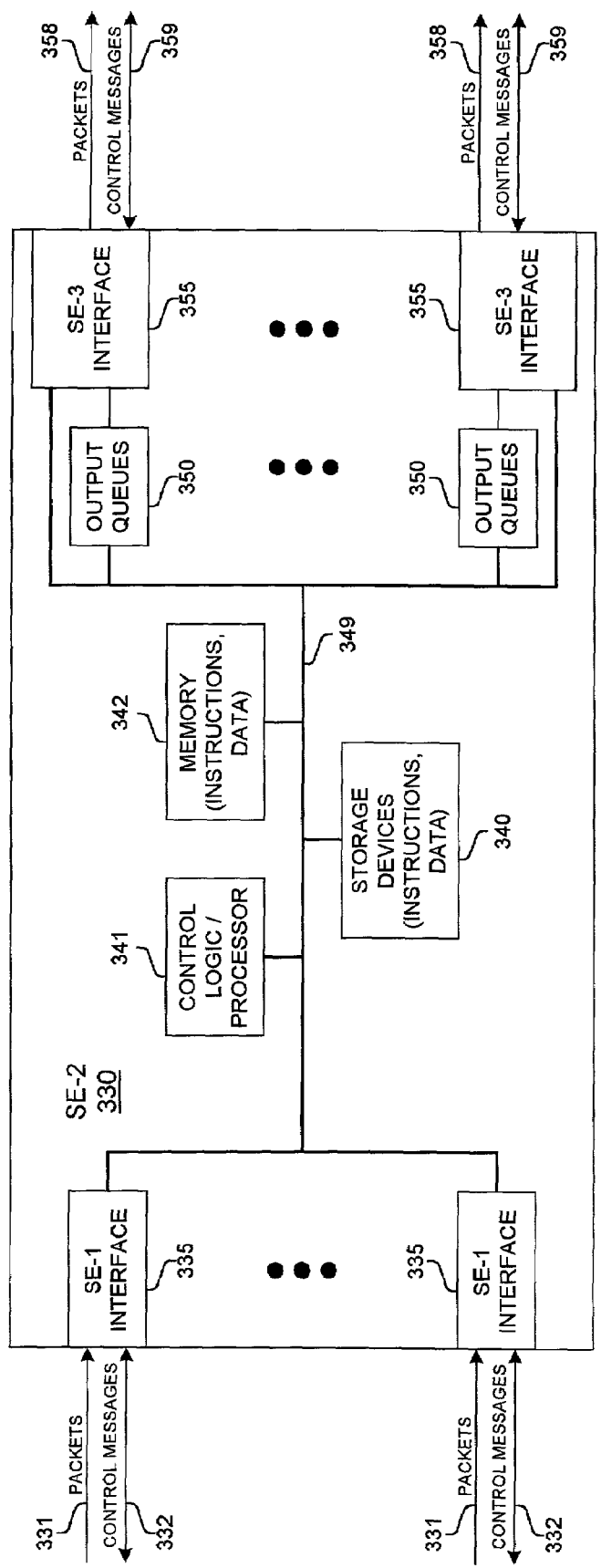
Figure 3C:
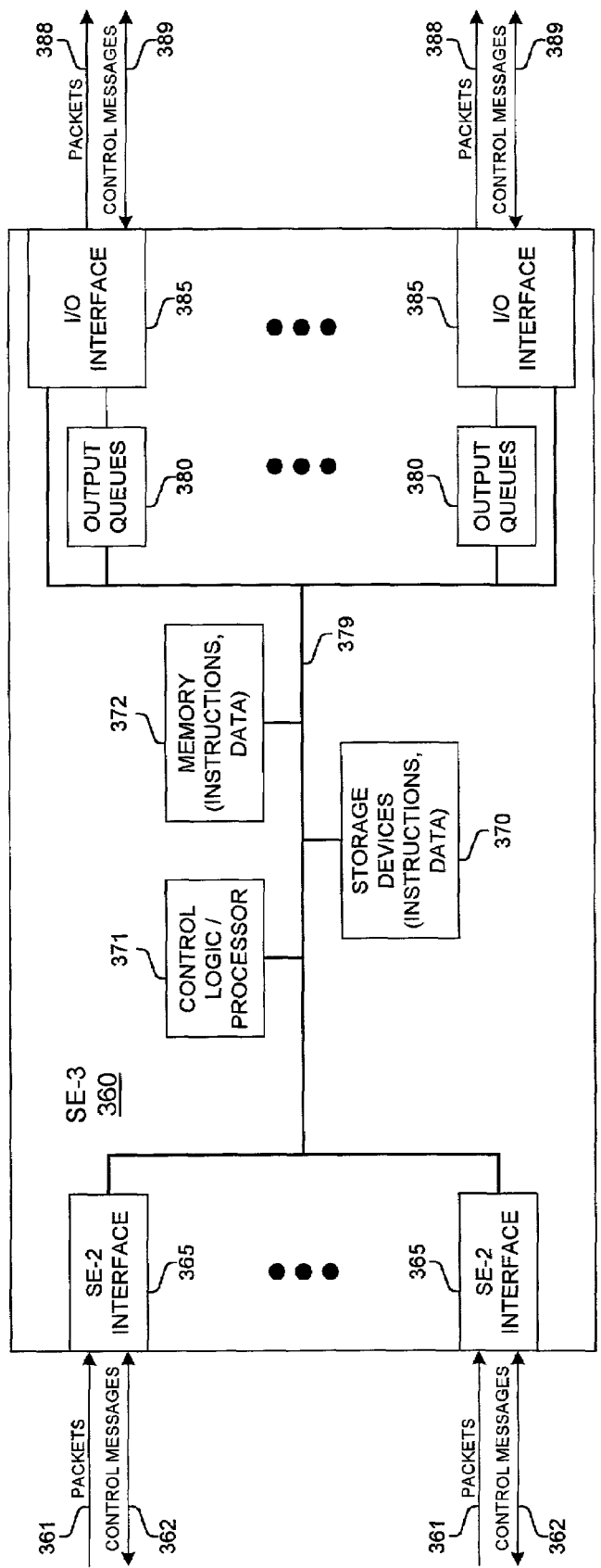

FIGS. 3A–C illustrate exemplary embodiments of switching elements and/or their components. FIG. 3A is a block diagram of one embodiment of a first stage switching element, SE-1 300. FIG. 3B is a block diagram of one embodiment of a second stage switching element SE-2 330. FIG. 3C is a block diagram of one embodiment of a third stage switching element SE-3 360. As would be understood by one skilled in the art, the invention is not limited to these or any other embodiment described herein.

FIG. 3A illustrates an embodiment of SE-1 300 comprising control logic and/or processor 311 (hereinafter "control logic"), memory 312, storage devices 310, I/O interfaces 305, output queues 320, SE-2 interfaces 325, and one or more internal communications mechanisms 319 (shown as a bus for illustrative purposes). In certain embodiments, control logic 311 comprises custom control circuitry for controlling the operation of SE-1 300 and no storage device 310 is used. Memory 312 is one type of computer-readable medium, and typically comprises random access memory (RAM), read only memory (ROM), integrated circuits, and/or other memory components. Memory 312 typically stores computer-executable instructions to be executed by control logic 311 and/or data which is manipulated by control logic 311 for implementing functionality in accordance with certain embodiments of the invention. Storage devices 310 are another type of computer-readable medium, and may comprise, for example, disk drives, diskettes, networked services, tape drives, and other storage devices. Storage devices 310 typically store computer-executable instructions to be executed by control logic 311 and/or data which is manipulated by control logic 311 for implementing functionality disclosed herein.

SE-1 300 generates, consumes, processes and reacts to fault indications as further described in detail hereinafter. Briefly first, each SE-1 300 receives packets 301 and exchanges control messages 302 over one or more links with one or more input interfaces (not shown) such as input/output interface 290 (FIG. 2C) via I/O interfaces 305. Additionally, each SE-1 300 sends packets 328 and exchanges control messages 329 over one or more links with one or more SE-2 elements (not shown) such as SE-2 330 (FIG. 3B) via SE-2 interfaces 325. Control logic 311 detects faults, generates control packets containing indications of the detected faults, and updates its fault data structure stored in memory 312. SE-1 300 may distribute fault indications to other packet switching components by sending control packets to other components as well as including fault indications in reserved fields of other control messages (e.g., acknowledgment or clear-to-send control messages) being sent. Outgoing packets and control messages are placed in output queues 320. In one embodiment, there is an output queue 320 for each destination, or for each class of service for each destination.

FIG. 3B illustrates an embodiment of SE-2 330 comprising control logic and/or processor 341 (hereinafter "control logic"), memory 342, storage devices 340, SE-1 interfaces 335, output queues 350, SE-3 interfaces 355, and one or more internal communications mechanisms 349 (shown as a bus for illustrative purposes). In certain embodiments, control logic 341 comprises custom control circuitry for controlling the operation of SE-2 330 and no storage device 340 is used. Memory 342 is one type of computer-readable medium, and typically comprises random access memory (RAM), read only memory (ROM), integrated circuits, and/or other memory components. Memory 342 typically stores computer-executable instructions to be executed by control logic 341 and/or data which is manipulated by control logic 341 for implementing functionality described herein. Storage devices 340 are another type of computer-readable medium, and may comprise, for example, disk drives, diskettes, networked services, tape drives, and other storage devices. Storage devices 340 typically store computer-executable instructions to be executed by control logic 341 and/or data which is manipulated by control logic 341 for implementing functionality described herein.

SE-2 330 generates, consumes, processes and reacts to fault indications as further described in detail hereinafter. Briefly first, each SE-2 330 receives packets 331 and exchanges control messages 332 over one or more links with one or more SE-1 elements (not shown) such as SE-1 300 (FIG. 3A) via SE-1 interfaces 335. Additionally, each SE-2 330 sends packets 358 and exchanges control messages 359 over one or more links with one or more SE-3 elements (not shown) such as SE-3 360 (FIG. 3C) via SE-3 interfaces 355. In one embodiment using a folded topology, the links between (a) SE-2 330 and SE-1 300 and (b) SE-2 330 and SE-3 360 are the same links. Control logic 341 receives control packets containing fault indications, and updates its fault data structure stored in memory 342. Additionally, fault indications are broadcast through the packet switch or packet switching system, such as to all the I/O interfaces. Depending on the capabilities of the packet switching system, either a packet broadcast or multicast function can be used to efficiently distribute the fault indications; otherwise multiple packets are sent. Additionally, it is possible that fault indications are collected and sent on a periodic or on an event basis. However, in one embodiment fault indications are distributed immediately.

SE-2 330 may distribute fault indications to other packet switching components by sending control packets as well as including fault indications in reserved fields of other control messages (e.g., acknowledgment or clear-to-send control messages) being sent. Outgoing packets and control messages are placed in output queues 350. In one embodiment, there is an output queue 350 for each destination, or for each class of service for each destination.

FIG. 3C illustrates an embodiment of SE-3 360 comprising control logic and/or processor 371 (hereinafter "control logic"), memory 372, storage devices 370, SE-2 interfaces 365, output queues 380, I/O interfaces 385, and one or more internal communications mechanisms 379 (shown as a bus for illustrative purposes). In certain embodiments, control logic 371 comprises custom control circuitry for controlling the operation of SE-3 360 and no storage device 370 is used. Memory 372 is one type of computer-readable medium, and typically comprises random access memory (RAM), read only memory (ROM), integrated circuits, and/or other memory components. Memory 372 typically stores computer-executable instructions to be executed by control logic 371 and/or data which is manipulated by control logic 371 for implementing functionality described herein. Storage devices 370 are another type of computer-readable medium, and may comprise, for example, disk drives, diskettes, networked services, tape drives, and other storage devices. Storage devices 370 typically store computer-executable instructions to be executed by control logic 371 and/or data which is manipulated by control logic 371 for implementing functionality described herein.

SE-3 360 generates, consumes, processes and reacts to fault indications as further described in detail hereinafter. Briefly first, each SE-3 360 receives packets 361 and exchanges control messages 362 over one or more links with one or more SE-2 elements (not shown) such as SE-2 330 (FIG. 3B) via SE-2 interfaces 365. Additionally, SE-3 360 sends packets 388 and exchanges control messages 389 over one or more links with one or more output interface elements (not shown) such as Input/Output interface 390 (FIG. 2C) via I/O interfaces 385. Control logic 371 receives control packets containing fault indications, and updates its fault data structure stored in memory 372. SE-3 360 may distribute fault indications to other packet switching components by sending control packets as well as including fault indications in reserved fields of other control messages (e.g., acknowledgment or clear-to-send control messages) being sent. Outgoing packets and control messages are placed in output queues 380. In one embodiment, there is an output queue 380 for each destination, or for each class of service for each destination.

Figure 4:
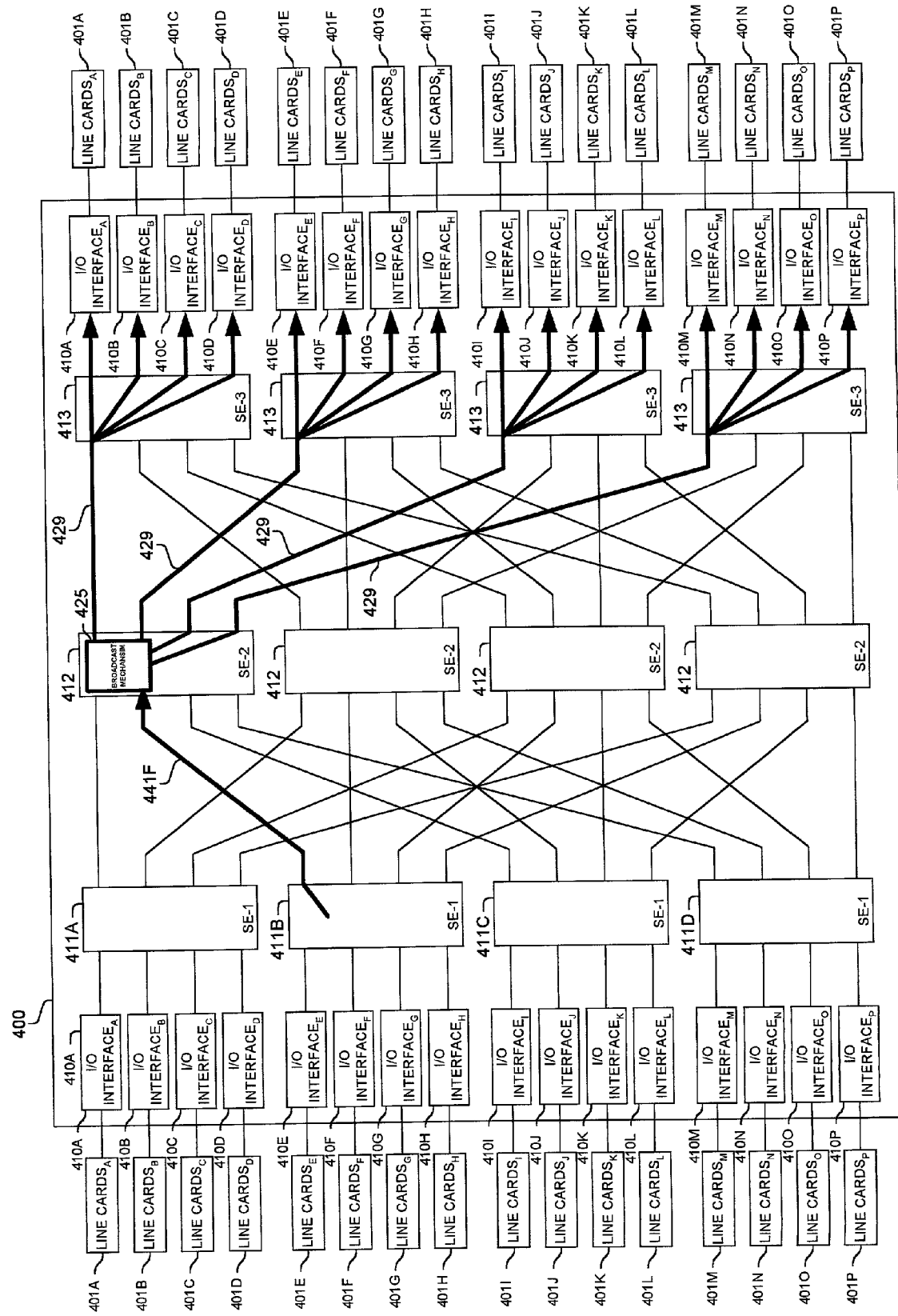
FIG. 4 is a block diagram illustrating the operation of a broadcast mechanism within one of the interconnection networks for broadcasting fault information in a packet switching system.

FIG. 4 illustrates a logical diagram of the operation of an embodiment for distributing fault indications to I/O interfaces 410. In certain embodiments of packet switching systems, it is important to broadcast the status of detected faults to all I/O interfaces 410. FIG. 4 illustrates the operation of the collection and broadcast of an indication of an identified fault using a packet switching system having multiple line cards 401, each connected to an I/O interface 410. Note, the topology illustrated in FIG. 4 is that of a folded packet switch, and that each line card 401 and I/O interface 410 are shown both on the left and right side of FIG. 4 for simplicity of illustration. Also, switch elements SE-1 411 and SE-3 413 are illustrated separately; however in certain embodiments such as that illustrated in FIG. 1C, these are embodied in the same component.

Figure 5A:
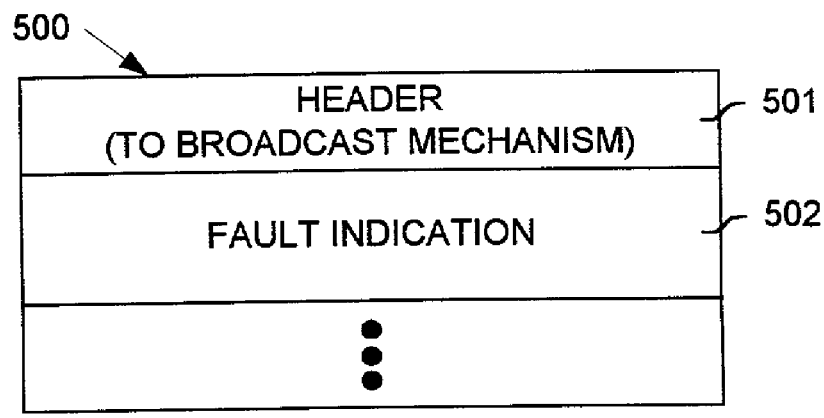
FIGS. 5A–B illustrate exemplary packet formats used in propagating fault information.
Figure 5B:
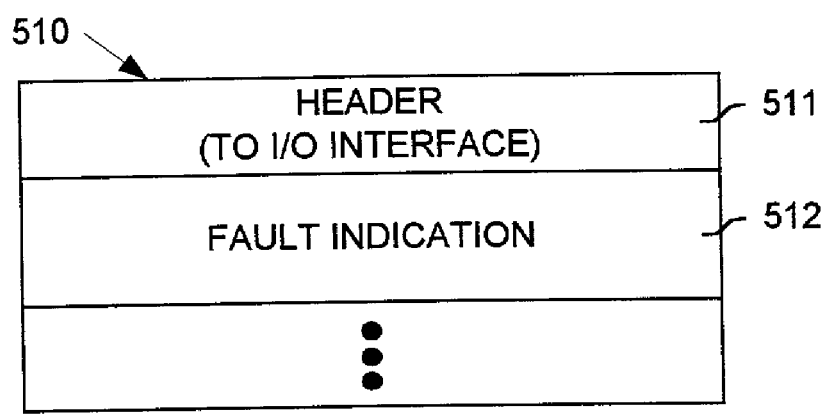

For illustrative purposes, the example shown in FIG. 4 assumes a fault is detected in SE-1 component 411B. The teachings of FIG. 4 and its discussion can be directly applied to other components. Upon detection of a fault, SE-1 component 411B generates a control packet containing the fault indication. An example of such is shown by packet 500 in FIG. 5A, whose header contains the destination address of a broadcast mechanism 425, and contains the indication of the fault in field 502. This control packet 500 is sent by SE-1 component 411B to broadcast mechanism 425 over link 441F. Broadcast mechanism 425 receives packet 500, and then creates and sends one or more packets to the I/O interfaces. An example of such is shown by packet 510 in FIG. 5B. Header field 511 contains the destination address of an I/O Interface 410, and field 512 contains the indication of the fault. One or more packets 510 are then sent over links 429 to each of the I/O interfaces 410.

Figure 7A:
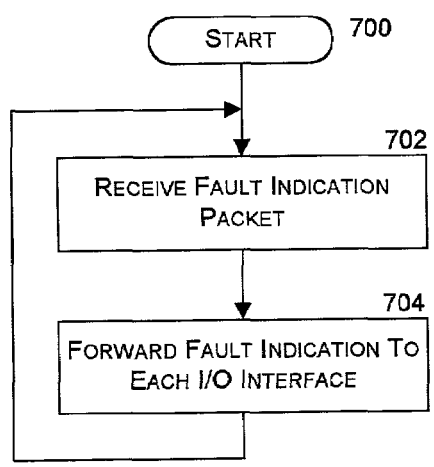
FIGS. 7A–C are embodiments that propagate and react to detected fault conditions.

The processing by one embodiment of a broadcast mechanism is illustrated in FIG. 7A. Referring to FIG. 7A, processing begins at step 700, and proceeds to step 702 where a control packet containing a fault indication is received. Then, in step 704, one or more control packets are created and broadcast, multicast, and/or sent to each of the I/O interfaces.

In one embodiment, a control packet containing a fault indication is sent to two or more different broadcast mechanisms to increase the likelihood of all I/O interfaces receiving the fault indication. As would be understood by one skilled in the art, these and other variations are contemplated and accommodated by the extensive number of possible embodiments.

Figure 7B:
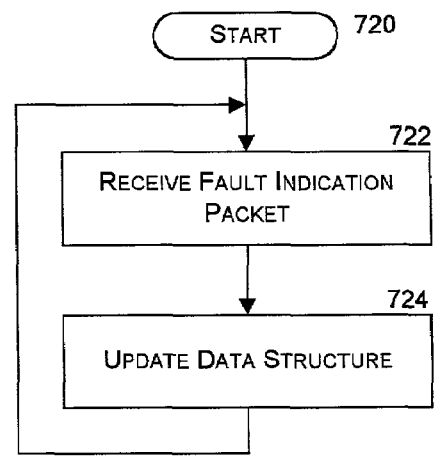

FIG. 7B illustrates one embodiment of the processing by an I/O interface for maintaining one or more data structures containing fault indications. Referring to FIG. 7B, processing begins at step 720, and proceeds to step 722 where the I/O interface receives a packet containing a fault indication. Next, in step 724, the I/O interface updates one or more data structures it maintains of fault indications. These data structures may be updated to directly indicate the received indications of faults. In some embodiments, an additional thresholding function is performed to disable traffic from being sent to a destination when the number of paths leading to the destination falls below some predetermined threshold value (e.g., number of paths, percentage of total paths, etc.). This predetermined threshold value may be preconfigured, or determined during operation to adjust to conditions of the packet switching system. For example, if nine of ten paths leading to a destination are unavailable, then traffic being sent to the destination may be required to be sent over some smaller number of paths leading to the destination than when the packet switching system is fully operational. This may lead to congestion inside the packet switch system and/or congestion at the input interfaces of the packet switch system. By disabling the traffic to the destination from some or all of the input interfaces, this traffic congestion situation may be avoided. Processing then returns to step 722 to receive more fault indications.

Figure 6A:
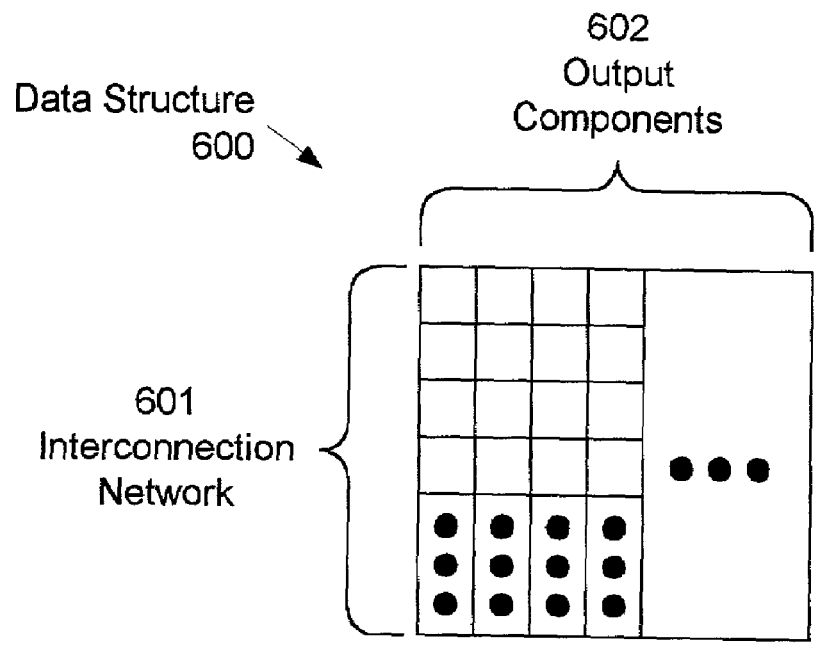
FIGS. 6A–B illustrate exemplary data structures used to maintain fault information in a component of a packet switching system.
Figure 6B:
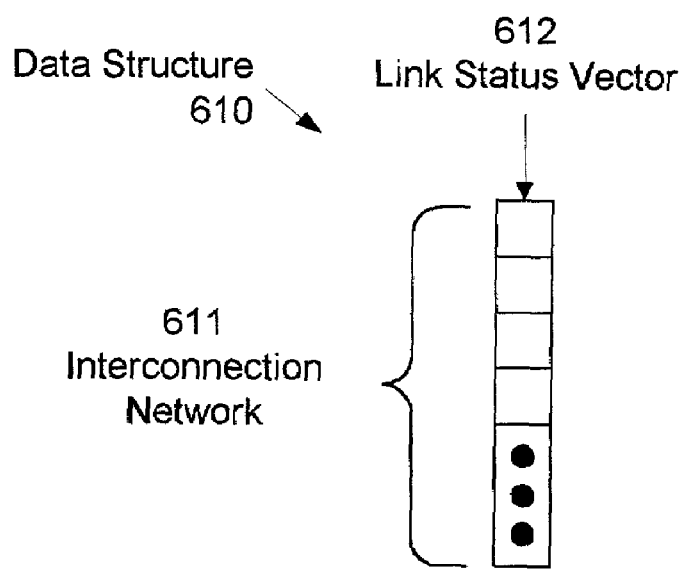

FIGS. 6A–B illustrate two of many different embodiments of data structures that could be maintained by an I/O interface to indicate fault conditions within the packet switching system. Data structure 600 is a table, typically implemented as a two-dimensional array or linked list, which maintains an entry for each output component 602 that is reachable over each interconnection network 601. In this manner, an I/O interface can easily determine which interconnection networks are available to deliver a particular packet destined for a particular output component (e.g., an I/O interface, line card, or port thereof, etc.) by looking at the appropriate column of data structure 600.

In one embodiment, data structure 610 is maintained in place of, or in addition to, data structure 600. One embodiment of data structure 610 is a link status vector 612, typically implemented as a bit vector, which indicates a link status for each interconnection network 611 to which it is coupled. In one embodiment, a bit is cleared in data structure 610 if the I/O interface is prevented from sending to the particular interconnection network 611.

Figure 8:
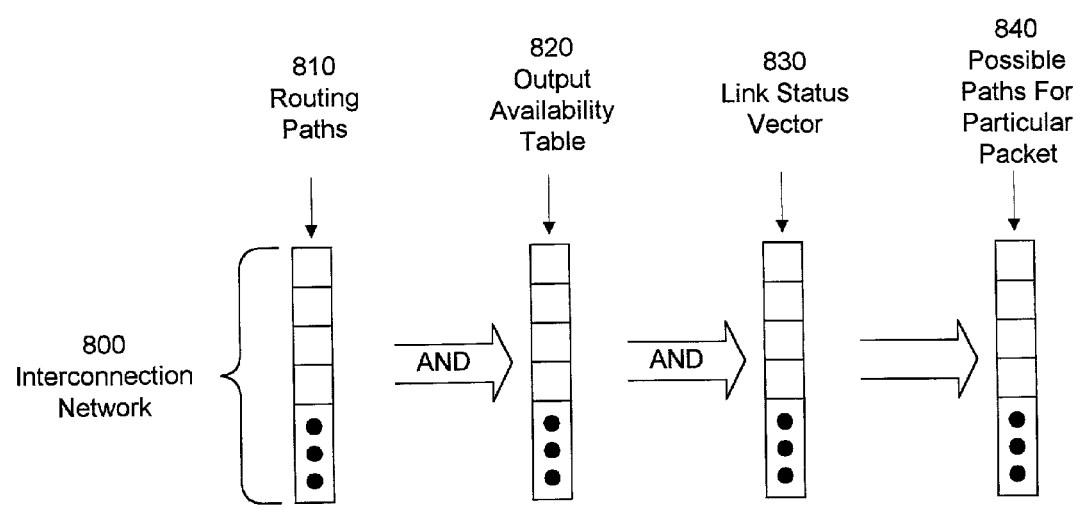
FIG. 8 illustrates manipulating data structures in determining a path through the packet switching system for a particular packet.

FIG. 8 illustrates one embodiment's use of data structures 600 and 610 in determining a route for a particular packet. A set of possible routing paths is determined and maintained by a routing mechanism, which can be represented by bit vector 810. By performing an AND function with output availability table 820 (e.g., the column of data structure 600 corresponding to the particular destination) and link status vector 830 (e.g., link status vector 612), a set of possible paths for the particular packet is generated and represented by bit vector 840. Bit vector 840 is then used by a routing mechanism to select one of the possible paths (e.g., corresponding to a set bit in bit vector 840), such as by using a round-robin, random, even distribution, or other deterministic or non-deterministic method. In some embodiments, as previously described herein, a thresholding function is used to set the values corresponding to a particular output of the output availability table 820 to zero when the number of available paths represented in the routing paths data structure 810 falls below a predetermined threshold value.

Figure 7C:
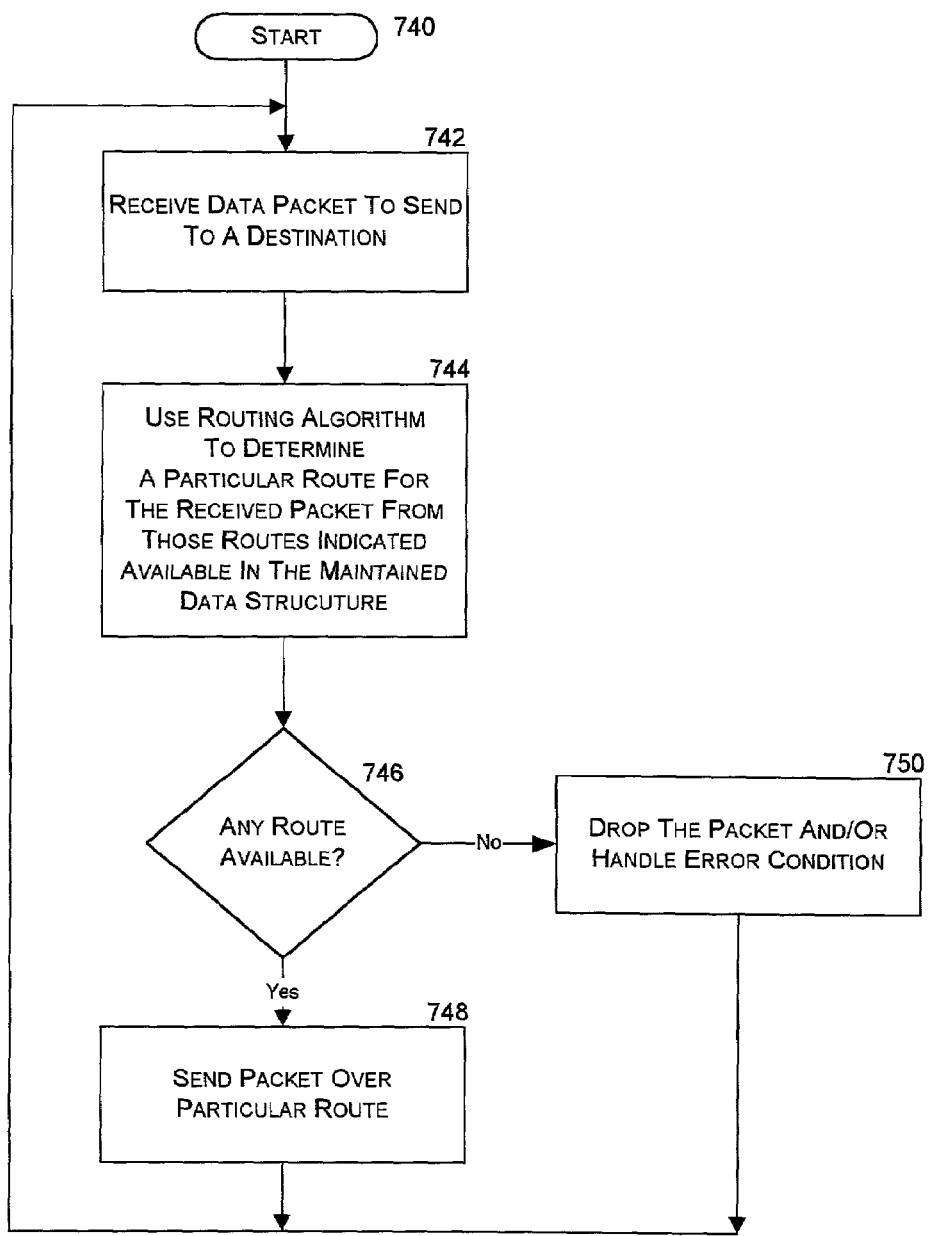

FIG. 7C illustrates one embodiment of an I/O interface for determining a route for, and sending packets using the maintained one or more data structures of fault indications. Processing begins at step 740, and proceeds to step 742 where a particular packet is received to be sent to a particular destination. Next, in step 744, a routing mechanism determines a particular route for the received packet from those routes indicated as available in the maintained one or more data structures. One embodiment of this processing was previously described in relation to FIG. 8.

Next, if there is a possible route for the received packet, as determined in step 746, then the packet is sent over the route determined in step 744. Otherwise, in step 750, the packet may be dropped packet as the packet cannot be currently sent from the I/O interface to its intended destination. Additionally, some error handling (e.g., generating alarms, dropping the packet, sending control information to the packet's sender, etc.) may be performed in step 750. Processing then returns to step 742 to process more packets.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A method performed by a packet switch, the packet switch including one or more multistage interconnection networks, each of said one or more multistage interconnection networks including a plurality of switching stages which include a first switching stage, a final switching stage, and one or more intermediate switching stages in between the first and final switching stages, said one or more intermediate switching stages including a broadcast component, the method comprising:

recognizing an error within the packet switch by one of the plurality of switching stages;

sending a particular packet from said one of the plurality of switching stages to the broadcast component through at least a portion of said one or more interconnection networks in response to said recognizing the error, the particular packet including an indication of the error and an indication corresponding to the broadcast component;

notifying a plurality of input components of the packet switch of the error, said notifying including sending one or more packets indicating the error from the broadcast component through at least a second portion of said one or more interconnection networks, said second portion including the final switching stage;

each of the plurality of input components updating one or more status data structures in response to receiving a notification of the error; and each of the plurality of input components determining which particular path of a plurality of paths leading to a destination output component over which to send a packet received at said respective input component, with the path being determined by referencing said one or more status data structures; which includes ANDing a bit vector representing a set of possible paths leading to the destination output component with one or more bit vectors representing the status set of possible paths maintained in said one or more data structures to identify a set of available paths, and selecting said particular path from the set of available paths.

2. The method of claim 1, wherein the one or more data structures include an output availability table to indicate whether a possible path through the packet switching system from the input component to a particular destination is available.

3. The method of claim 1, further comprising disabling at least one of the plurality of input components from sending packets to a particular destination of the packet switching system when a number of possible paths through the packet switching system leading to the particular destination falls below a predetermined threshold value as identified by one or more received packets containing indications of one or more errors.

4. The method of claim 3, wherein the predetermined threshold value is greater than one.

5. The method of claim 1, further comprising disabling at least one of the plurality of input components from sending packets to a particular destination of the packet switching system when a number of possible paths through the packet switching system leading to the particular destination equals one.

6. A packet switch including one or more multistage interconnection networks, each of said one or more multistage interconnection networks including a plurality of switching stages which include a first switching stage, a final switching stage, and one or more intermediate switching stages in between the first and final switching stages, said or more intermediate switching stages including a broadcast component, the packet switch comprising:

means for recognizing an error within the packet switch by one of the plurality of switching stages;

means for sending a particular packet from said one of the plurality of switching stages to the broadcast component through at least a portion of said one or more interconnection networks, said means for sending a particular packet being responsive to said means for recognizing the error, and wherein the particular packet includes an indication of the error and an indication corresponding to the broadcast component;

means for notifying a plurality of input components of the packet switch of the error, said notifying including means for sending one or more packets indicating the error from the broadcast component through at least a second portion of said one or more interconnection networks, said second portion including the final switching stage;

means for each of the plurality of input components updating one or more status data structures in response to receiving a notification of the error; and means for each of the plurality of input components to determine which particular path of a plurality of paths leading to a destination output component over which to send a packet received at said respective input component, with the path being determined by referencing said one or more status data structures; which includes ANDing a bit vector representing a set of possible paths leading to the destination output component with one or more bit vectors representing the status the set of possible paths maintained in said one or more data structures to identify a set of available paths, and selecting said particular path from the set of available paths.

7. The packet switch of claim 6, wherein said one or more data structures include an output availability table to indicate whether a possible path through the packet switching system from the input component to a particular destination is available.

8. The packet switch of claim 6, comprising means for disabling at least one of the plurality of input components from sending packets to a particular destination of the packet switching system when a number of possible paths through the packet switching system leading to the particular destination falls below a predetermined threshold value as identified by one or more received packets containing indications of one or more errors.

9. The packet switch of claim 8, wherein the predetermined threshold value is greater than one.

10. The packet switch of claim 6, comprising means for disabling at least one of the plurality of input components from sending packets to a particular destination of the packet switching system when a number of possible paths through the packet switching system leading to the particular destination equals one.

* * * * *

UNITED STATES PATENT AND TRADEMARK OFFICE
CERTIFICATE OF CORRECTION

PATENT NO. : 6,990,063 B1  
DATED : January 24, 2006  
INVENTOR(S) : Lenoski et al.

It is certified that error appears in the above-identified patent and that said Letters Patent is hereby corrected as shown below:

Column 5,
Line 25, replace "signals. 201" with -- signals 201 --.

Signed and Sealed this

Sixteenth Day of May, 2006

JON W. DUDAS  
*Director of the United States Patent and Trademark Office*